March 3, 1964 — V. E. MARKWICK — 3,123,393

CAMPER COACH AND METHOD OF CONSTRUCTION

Filed July 17, 1961 — 4 Sheets-Sheet 1

INVENTOR.
Verdun E. Markwick

March 3, 1964     V. E. MARKWICK     3,123,393
CAMPER COACH AND METHOD OF CONSTRUCTION
Filed July 17, 1961     4 Sheets-Sheet 2

INVENTOR
Verdun E. Markwick

March 3, 1964 V. E. MARKWICK 3,123,393
CAMPER COACH AND METHOD OF CONSTRUCTION
Filed July 17, 1961 4 Sheets-Sheet 3
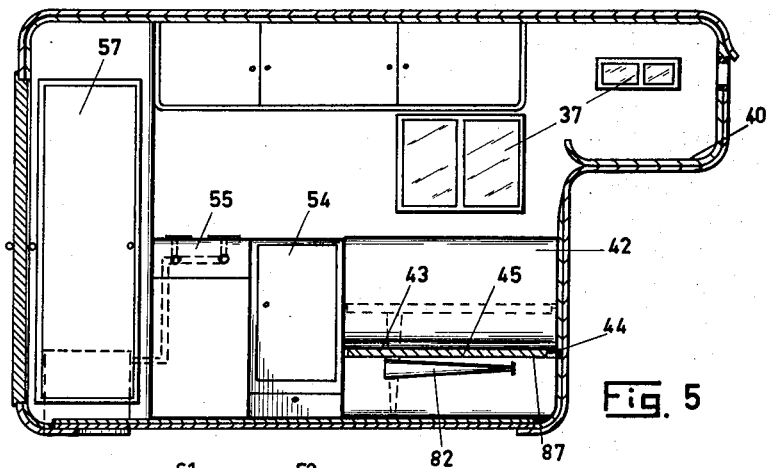
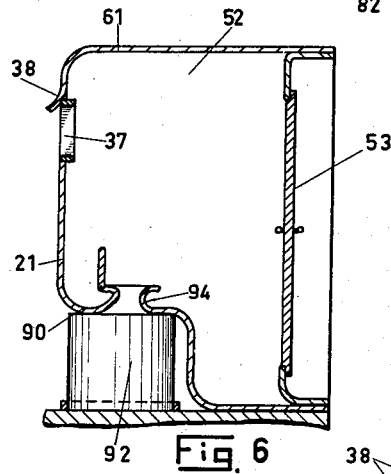
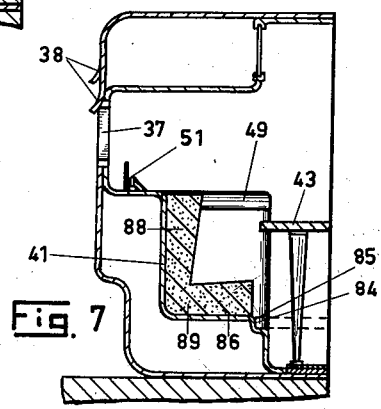
INVENTOR.
Verdun E. Markwick March 3, 1964  V. E. MARKWICK  3,123,393
CAMPER COACH AND METHOD OF CONSTRUCTION
Filed July 17, 1961  4 Sheets-Sheet 4

INVENTOR.
Verden E. Markwick

United States Patent Office 3,123,393
Patented Mar. 3, 1964

3,123,393
CAMPER COACH AND METHOD OF
CONSTRUCTION
Verdun E. Markwick, Stoney Creek, Ontario, Canada
(% Canadian Research & Development Foundation,
1434 Queen St. W., Toronto 3, Ontario, Canada)
Filed July 17, 1961, Ser. No. 124,613
4 Claims. (Cl. 296—23)

This invention relates to mobile dwellings and the like and, more particularly, to a camper coach carried by an open truck, and which may be utilized in combination with a truck or removed therefrom for temporary or permanent use at a selected site.

It is conventional practice for persons traveling on vacation, hunting trips or the like to tow house trailers or tent trailers for use in locations remote from their homes. The disadvantages of a house trailer lies in the fact that it is an extremely heavy load for a conventional car to pull, giving rise to strain on the chassis, the engine, and especially the clutch. The towing vehicle also requires a special trailer hitch, and extra hook ups for brake and rear lights. Furthermore, they require special licenses.

Tent trailers, while much lighter than house trailers, have their own peculiar disadvantages inasmuch as, being canvas, they are subject to leaks, they are often torn, require frequent reproofing, and, after a few years' wear, tend to rot and require replacement.

An aluminum coach has also been adapted for incorporation with an open truck and this, however, has the disadvantages that it is comparatively heavy, requires structural bracing, is not fully streamlined and, once fitted to a truck, cannot be moved easily should it be required to do so in, say, a remote location. Furthermore, in all the wooden and metal structures utilized as house trailers or coaches, the construction relies on screws, bolts, rivets and the like and these, after many miles of travel, especially over rough terrain or, even, secondary roads, tend to work loose and give rise to structural defects.

Yet another disadvantages of prior house trailers and the like is that they are extremely expensive both in initial cost and in the cost of towing. A further disadvantage in trailers of the prior art lies in the fact that the furniture supplied therewith, even though it is substantially built in, is supplied in separate units for subsequent securing within the trailer. Again, even aluminum construction is subject to corrosion and requires frequent painting to retain its appearance both inside and outside.

It is an object of this invention to provide a camping coach of fibreglass construction which is light and easily portable, its weight being approximately one third of that of aluminum.

It is another object of this invention to provide a camping coach that will fit into a standard pick up truck and thereby eliminate the equipment associated with trailers, such as hitches, licenses, stop lights, brakes and the like.

It is yet another object of this invention to provide a camping coach having all the edges and corners rounded and presenting a substantially aesthetic appearance.

It is yet another object of this invention to provide a camping coach which is sufficiently strong structurally to preclude the use of external girders or the like.

It is yet another object of this invention to provide a camping coach deriving its structural strength from a double skin of fibreglass the inner skin of which is strengthened by internal fittings such as closets, seats and the like.

It is a further object of this invention to provide a camping coach which, being of moulded construction, does not utilize bolts, rivets or the like and, therefore, is free of the defects inherent with such components.

It is yet another object of this invention to provide a camping coach which being of fibreglass construction, is impervious to moisture and which will not rust or otherwise corrode.

It is still another object of this invention to provide a camping coach which may have any desired colour of the walls, etc. thereof permanently embodied in the construction thereof.

It is another object of this invention to provide a camping coach which, being formed of at least two skins, may have an outer colour different from that of the inside.

It is still another object of this invention to provide a camping coach which, being of fibreglass is insulated against heat and cold.

It is yet another object of this invention to provide a camping coach in which all the components, furniture and the like may be moulded in during manufacture, thereby cutting down both on cost of these items and labour for the fitting thereof.

It is another object of this invention to provide a camping coach containing a water reservoir which may be filled by an external fitting by any conventional hose method.

It is still another object of this invention to provide a camping coach which, under normal weather conditions, is substantially indestructible.

It is still another object of this invention to provide a camping coach which may be manufactured utilizing moulds and in particular by moulding an inner and outer shell, the inner shell embodying an inner wall and furniture, the outer shell comprising an outer, weatherproof covering and window means.

These and other objects and features of the invention will become apparent when taken in conjunction with the accompanying drawings in which:

FIG. 5 is a sectional side elevation of the invention take on the line 5—5 of FIG. 2, illustrating particularly the arrangement of internal fittings on the left hand side of the coach.

FIG. 6 is a fractional, vertical sectional elevation of a toilet embodied in the present invention, taken on the line 6—6 of FIG. 2, illustrating the moulding of the fittings and the location of the septic tank.

FIG. 7 is a fractional, vertical, sectional elevation of a seat and table embodied in the present invention, taken on the line 7—7 of FIG. 2.

Figure 1:
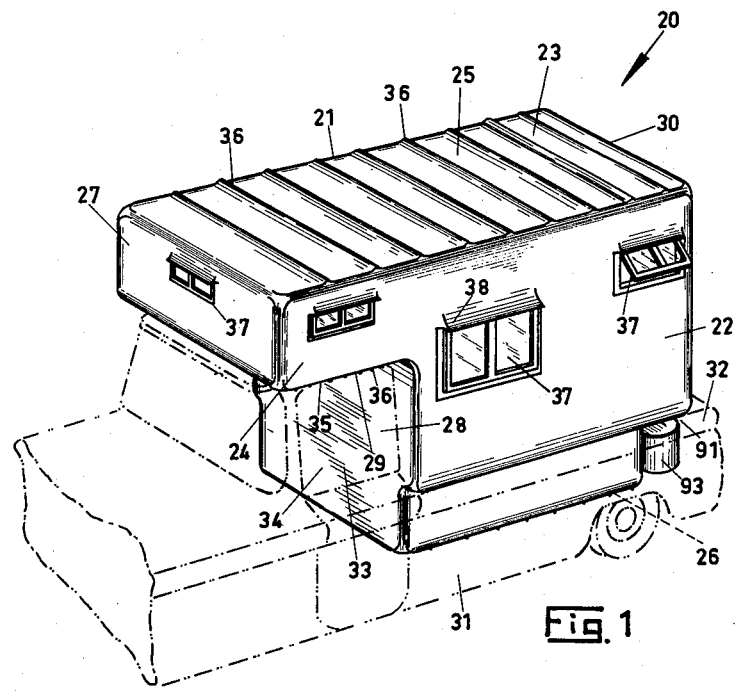
FIG. 1 is a perspective view of a camping coach embodying the present invention shown installed on a pick up truck.

Referring to FIG. 1, a camper coach 20 includes two oppositely located sides 21 and 22 of substantially gnomon configuration. Coach 20 comprises a substantially square body portion 23 having an upper, forwardly extending portion 24. A roof 25 extends the whole length of sides 21 and 22 and a floor portion 26 extends for only the length of body 23. A front wall 27 interconnects the forward edges of sides 21 and 22 and an intermediate wall 28 interconnects sides 21 and 22 with the forward edges of floor 26. A horizontal shelf 29 occupies the area bounded by the lower edge of front wall 27, the upper edge of intermediate wall 28, and sides 21 and 22. The rear end of body portion 23 is enclosed by a rear wall 30.

Body portion 23 is adapted to fit closely within the open body of a pick up truck 31, rear wall 30 being contiguous with the tail gate 32 thereof and intermediate wall 28 being similarly contiguous with the rear wall 33 of cab 34 thereof. Shelf 29 of coach 20 is adapted to rest upon roof 35 of cab 34 and forward portion 24 of coach 20, although herein illustrated as being substantially coextensive with cab 34, may vary in length to either be shorter than or overhang cab 34 without departing from the spirit of the invention.

A plurality of parallel, spaced apart transverse corrugations 36 extend across roof 25 of coach 20 and similarly across shelf 29 of forward portion 24 thereof to provide added strength and rigidity thereto.

A plurality of substantially conventional window units 37 are installed in sides 21 and 22 and in front wall 27 of forward portion 24. A plurality of deflector strips 38 extend outwardly of sides 21 and 22 and front wall 27 over the upper edges of windows 37 and are adapted to protect windows 37 from ingress of moisture during rainstorms and the like.

Figure 2:
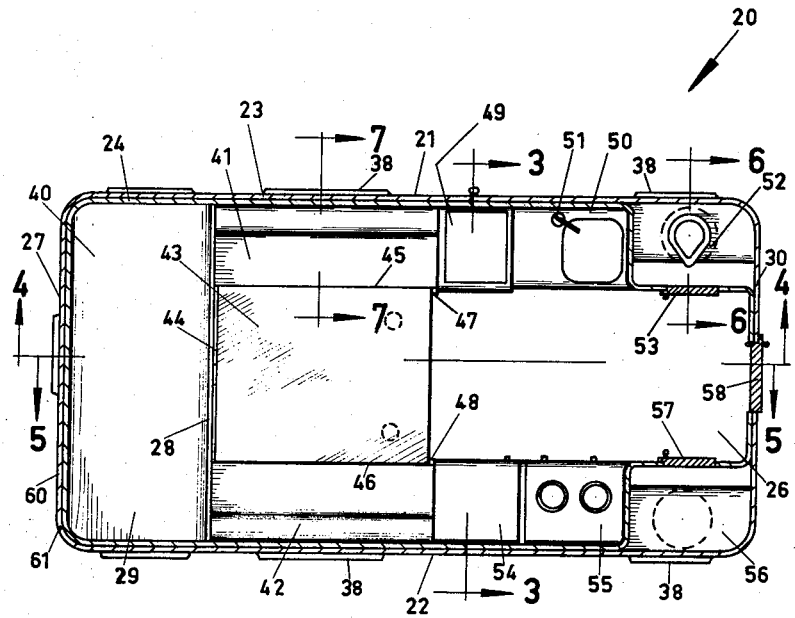
FIG. 2 is a plan view of the interior of the camping coach illustrated in FIG. 1.

Referring to FIG. 2, a plan view of the interior of coach 20 is shown in which the upper surface of shelf 29 is suitably upholstered to form a bed 40. The internal partitions integrally moulded in inner shell 61 are spaced apart from outer shell 60.

Figure 4:
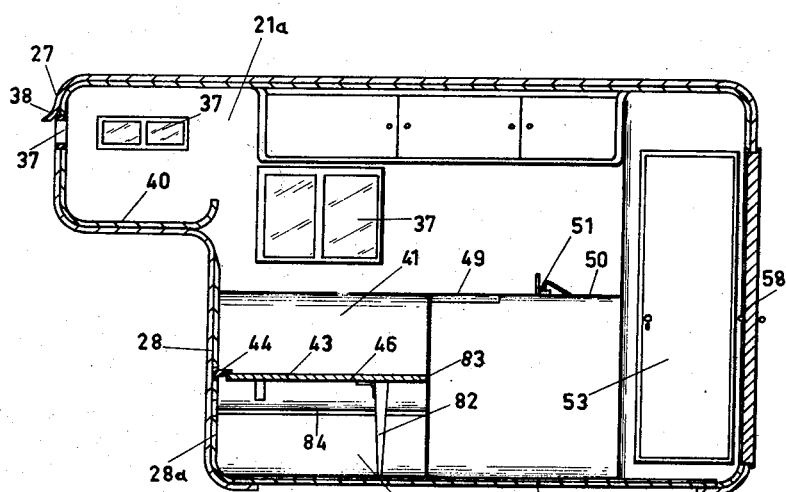
FIG. 4 is a sectional side elevation of the invention taken on the line 4—4 of FIG. 2, illustrating particularly the arrangement of internal fittings on the right hand side of the coach.

Referring also to FIG. 4, a settee type seat 41 moulded integrally in side 21 of inner shell 61 extends rearwardly from intermediate wall 28 for substantially half the remaining length of side 21. A similar seat 42 is oppositely located to seat 41 moulded integrally with wall 22 of inner shell 61. A table 43 having its forward edge 44 detachably attached to intermediate wall 28 is substantially the same length as seats 41 and 42, and is centrally located therebetween, its oppositely located longitudinal edges 45 and 46 being in substantially vertical alignment with the innermost edges 47 and 48 of seats 41 and 42 respectively.

The remainder of wall 21, from seat 41 to rear wall 30 of body portion 23 is substantially equally divided into three compartments integrally moulded in inner shell 61 comprising a water tank 49 the top of which may be utilized as counter space; an integrally moulded washbowl unit 50 adjacent to integrally moulded tank 49, having a combined pump and faucet 51 conveniently located so that water may be pumped from tank 49 into washbowl 50; and totally enclosed, integrally moulded closet 52 occupying the remainder of the space between washbowl 50 and rear wall 30, a hingedly affixed door 53 providing access thereto, and a toilet seat integrally moulded in outer shell 60 having an opening cooperable with an externally removable container 92.

Further referring to FIG. 5, an icebox 54, the upper surface of which provides counter space, is located immediately rearwardly of seat 42 and a stove assembly 55, adapted for use with propane gas or the like, is located next to icebox 54. A clothes closet 56 integrally moulded in inner shell 61 extends between stove 55 and rear wall 30 and it, too, is totally enclosed, a hingedly affixed door 57 providing access thereto.

A doorway 58 is provided substantially centrally in rear wall 30 and a door 59 hingedly fitted thereto to provide access to the interior of coach 20.

It will be noted on FIG. 2 that coach 20 comprises an outer shell 60 and an inner shell 61, both of which are moulded in fibreglass and subsequently joined by conventional bonding methods.

Figure 3:
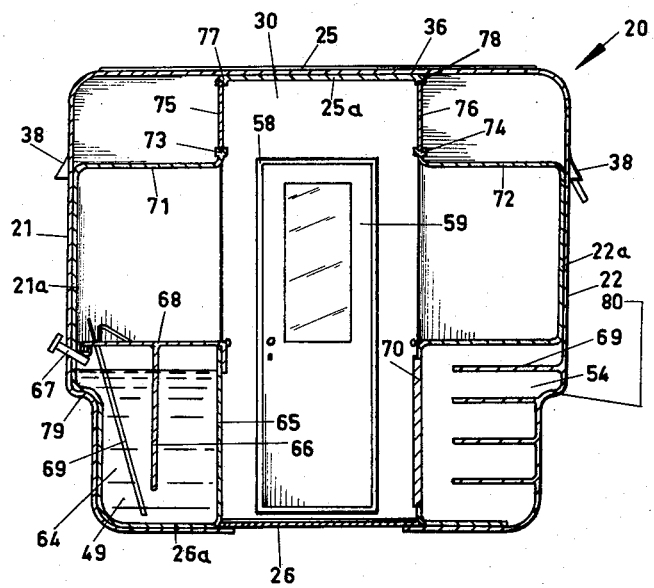
FIG. 3 is a sectional end elevation of the present camping coach taken on the line 3—3 of FIG. 2.

Referring to FIG. 3, further details of the construction of coach 20, and particularly of the construction of outer and inner shell 60 and 61 respectively are shown. It will be seen that outer shell 60 has a smooth exterior and is adapted to carry windows 37, deflector strips 38 and rear doorway 58 with its associated door 59 only.

Inner shell 61, however, has moulded integrally therewith all the internal furniture and fixtures associated with the interior of coach 20 as heretofore described. In this instance, it will be noted that side 21a of inner shell 61 which is contiguous with side 21 of outer shell 60, also forms one wall of water tank 49 as illustrated in FIG. 2. It should further be noted that, sides 64 of tank 49 are moulded integrally with side 21a and also with inner floor 26a. The innermost wall 65 of tank 49 is also moulded integrally with floor 26a and extends substantially vertically upwardly therefrom, and, it should be noted, sides 64 and wall 65 are also moulded integrally so that there are no joints, seams or the like in tank 49. This fact, coupled with the fact that fibreglass is impervious to water and non-corrodable, provides water tank 49 with these extremely desirable qualities. A moulded baffle member 66 extends vertically upwardly from floor 26a substantially midway within tank 49 in order to damp out excessive movement of water within tank 49 while traveling. A filler cap 67 extends through sides 21 and 21a of outer and inner shell 60 and 61 respectively to communicate with the interior of tank 49 and to permit the filling of tank 49 from outside coach 20. A removable, rectangular lid 68 is a close fit over the upper edges of tank 49, and a conventional length of tubing 69 connects the pump and faucet mechanism 51 to the bottom of tank 49 to facilitate removal of water therefrom.

Icebox 54 is similarly moulded integrally with side 22a of inner shell 61, fibreglass shelves 69 and door 70 thereto combining the heat resistant characteristics of fibreglass with ease of moulding.

Overhead shelves 71 and 72 extend longitudinally of, and horizontally inwardly from sides 21a and 22a respectively, each being located in parallel, spaced apart relationship with roof 25, their innermost longitudinal edges 73 and 74 respectively being turned upwardly and suitably grooved to accommodate sliding door assemblies 75 and 76 respectively. Grooved fittings 77 and 78 similar to edges 73 and 74 are moulded into roof portion 25a of inner shell 61 to act as the upper guides for sliding doors 75 and 76 respectively.

Doorway 58, as shown in FIG. 2, is moulded into rear wall 30 and, it should be noted, door 59 is also fabricated of fibreglass and hingeably affixed to doorway 58 in conventional manner.

It will also be noted that, in section, coach 20 is of slightly narrower dimensions as its lower end forming two oppositely located, longitudinal shoulders 79 and 80, so that upon being installed within a conventional pick up truck it will adapt to to the contour thereof and shoulders 79 and 80 will rest on the sides of pick up truck 31 as illustrated in FIG. 1.

Referring to FIGS. 4 and 5, the interior layout of coach 20 is fully shown and FIG. 4 illustrates particularly the method by which edge 44 of table 43 is detachably attached to the inner skin 28a of intermediate wall 28 and, furthermore, in FIG. 4 legs 82 of table 43 are in an extended position to support table 43 at a conventional height above seats 41 and 42, legs 82 being hingeably attached to the rearmost edge 83 of table 43. Referring also to FIGS. 5 and 7, it will be seen that table 43 may be detached from intermediate wall 28a and legs 82 swing upwardly and forward edge 44 of table 43 hooked into a lower position in intermediate wall 28a. Seats 41 and 42 each have a narrow, longitudinal shoulder 84 formed in their upper, innermost edges 47 and 48, shoulders 84—84 being adapted to support the oppositely located, longitudinal sides 45 and 46 of table 43 upon table 43 assuming the lower position. In this manner, table 43 and the horizontal portions 86 and 87 of seats 41 and 42 respectively present a flat horizontal base upon which further cushions or the like 88, which serve normally as backrests for seats 41 and 42, may be placed, in combination with normal seat cushions 89, to form an upholstered bed if so required.

Referring to FIGS. 1 and 6, it will be noted that the rear lower corners of coach 20 are recessed and, in combination with the floor and sides of truck 31 form two receptacles 90 and 91 adjacent sides 21 and 22 respectively. Receptacle 90 is utilized to receive a removable container 92 and receptacle 91 is adapted to house a fuel storage means 93 such as a propane gas tank. Suitable piping is adapted to connect tank 93 with stove 55 as illustrated in FIGS. 2 and 5.

Referring specifically to FIG. 6, it will be noted that a toilet means 94 is also moulded integral with side 21 of inner shell 61 within closet 52.

It will be obvious to one skilled in the art that a combination of outer and inner shells 60 and 61 form a durable and substantially rigid body for coach 20 and, furthermore, the integral moulding of all the internal members as herein described are instrumental in providing sufficient internal bracing to render the whole structure of coach 20 substantially rigid. In this way, no other bracing is required in order to maintain the contours of coach 20.

It should also be noted that a plurality of jacking points may be moulded into body 23 and, by use of suitable jacks, coach 20 may be raised clear of the truck bed and, after lowering tail gate 32, truck 31 may be driven away and coach 20 lowered. Removable container 92 and gas tank 93 will either be separately supported during this operation or may be clamped to the sides of their respective receptacles 90 and 91. In this manner, a coach 20 may be transported to a camp site by truck 31, removed therefrom and lowered onto the camp site, truck 31 may then be used in its normal capacity and coach 20 utilized as a self contained dwelling. Upon the occupants wishing to move from this location, coach 20 may be quickly and easily replaced on truck 31 for transportation elsewhere.

Figure 8:
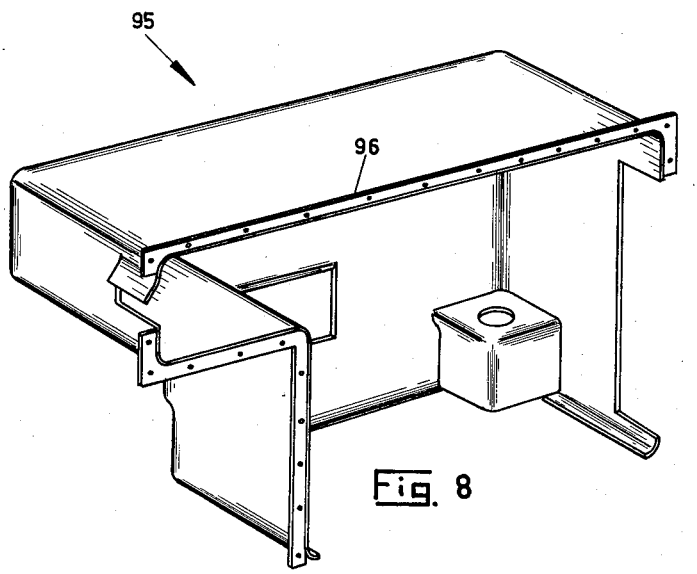
FIG. 8 is a perspective view of a half-mould utilized in fabricating the outer shell of the present invention.

Referring to FIG. 8, a half mould 95, utilized in the laying up of outer shell 60 of coach 20, is illustrated. A similar, oppositely handed mould, not illustrated, is provided for the other half of shell 60, both halves having congruent innermost edges 96. It will be noted that the innermost edges 96 of mould 95 are outwardly flanged and suitably drilled to permit the two halves to be bolted together during the make up of fibreglass outer shell 60.

Half mould 95 provides cut outs and forms for windows 37, doorway 58, deflector strips 38 and for the formation of receptacle 90 as illustrated in FIGS. 1, 3 and 6.

Fiberglass may be laid up by hand inside mould 95 and its mating half in a conventional manner. Upon completion of the lay up, the mould halves are broken apart and outer shell 60 removed therefrom by conventional means, such as for instance, by air or water pressure.

An alternative method of manufacturing outer shell 60 may be utilized in which fibreglass is sprayed onto the interior of the moulds, in which case experience dictates that the mould be quartered rather than halved as in the present illustration, to facilitate the removal of the outer shell 60 therefrom.

Figure 9:
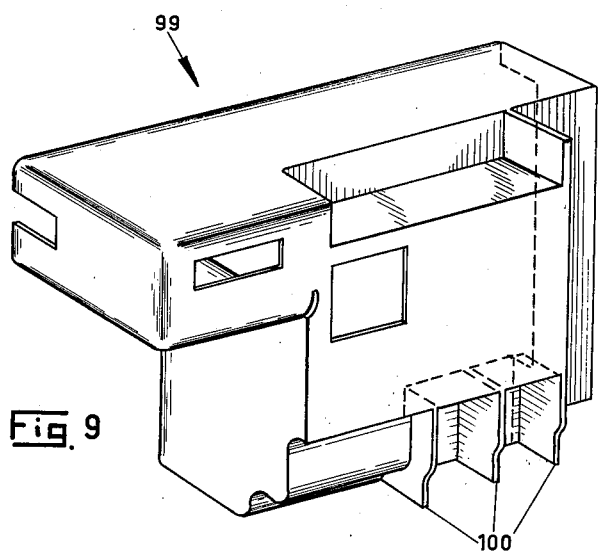
FIG. 9 is a perspective view of a half-mould utilized in fabricating the inner shell of the present invention.

Referring to FIG. 9, a half mould 99 utilized in the formation of one side of inner shell 61 is illustrated, a similar half mould being provided for the opposite side of inner shell 61, the innermost edges of each being congruent. Each inner half shell is adhesively affixed within its mating outer half shell to form half portions which are bolted together as described or secured together by other means. It will be noted that the fibreglass is either laid up by hand or sprayed from the outside of mould 99, there being similar cut outs for windows 37 as in half mould 95 illustrated in FIG. 8. In addition, mould 99 embodies hollow plates 100 necessary in the formation of the vertical walls integral with inner shell 61 which are required for the fabrication of water tank 49, washbowl 50 and the like. Mould 99 is also shaped to provide correct contours for seat 51, shelf 71, and for the walls of toilet 52.

After removal from mould 99, half innner shell 61 may be assembled within the outer shell 60, the mating surfaces being joined in conventional manner.

It should be noted that the floor 26 as illustrated in FIGS. 1 and 2 is not moulded in at this stage but applied separately after the two halves of inner shell 61 have been installed within outer shell 60. A conventional, hard wearing vinyl tile or the like flooring may also be applied to the upper surface of floor 26 thereby adding to the rigidity of the structure of coach 20.

By employing moulded fibreglass in this manner, coach 20 is easily manufactured and assembled. It also remains light weight and, furthermore, the moulding method enables coach 20 to be constructed with no sharp external edges, the rounding thereof, especially at the front of the coach, being sufficient to present far less resistance to air pressure than the conventional square edged models.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. A camper coach comprising an inner shell and an outer shell; said outer shell comprising two half shells; said inner shell comprising two half shells, the outer surface of each of said half shells of said inner shell substantially cooperable and adhesively secured to the inner surface of each corresponding half shell of said outer shell; each said half shell of said inner shell having integrally moulded members projecting inwardly and spaced apart from said outer shell; one said half shell of said inner shell having said members to define seat means, table means, sink means, upper storage means, and closet means, said table means having water storage means integral therewith, and said closet means having toilet means therein, said toilet means comprising a seat means integrally moulded in the mating outer half shell having an opening therein, said opening cooperably located with an externally removable container means; the second said half shell of said inner shell having said members to define seat means; upper storage means, lower storage means having shelf means therein, and closet storage means, said closet storage means having means cooperable with an externally removable fuel storage means; said shelf means integrally moulded in the mating outer half shell; said outer shell and said inner shell defining congruent openings thereby providing window means and door means.

2. A camper coach as defined in claim 1 in which said outer shell has receptacles cooperable with said removable container means and said removable fuel storage means.

3. A camper coach as defined in claim 1 in which said storage means and said closet means have doors therefor.

4. A camper coach as defined in claim 1 in which said inner shell has means to removably secure a foldable table, said table located centrally of the front wall of said camper coach; said seat means defined by each of said half shells of said inner shell being in parallel spaced-apart relationship to said table in assembled position; said seat means having means to support said table coplanar therewith whereby said seats and said tables become a platform which may be utilized as a bed.

(References on following page)

References Cited in the file of this patent

UNITED STATES PATENTS

| | | |
|---|---|---|
| 2,559,029 | Randolph | July 5, 1951 |
| 2,677,571 | Williams | May 4, 1954 |
| 2,883,233 | Beckley | Apr. 21, 1959 |
| 2,950,701 | Stefani | Aug. 30, 1960 |
| 3,023,045 | Cirami | Feb. 27, 1962 |

FOREIGN PATENTS

| | | |
|---|---|---|
| 790,253 | Great Britain | Feb. 5, 1958 |

OTHER REFERENCES

Article, "Low Pressure Laminates," in "Automobile Engineer"; December 1953, page 548 of 9 pages: Nos. 541 to 549, inclusive.

Publication, "Dreamer Coach," of Coons Custom Coach Mfg. Co., Dec. 21, 1960, 5 pages.